Figure 1:
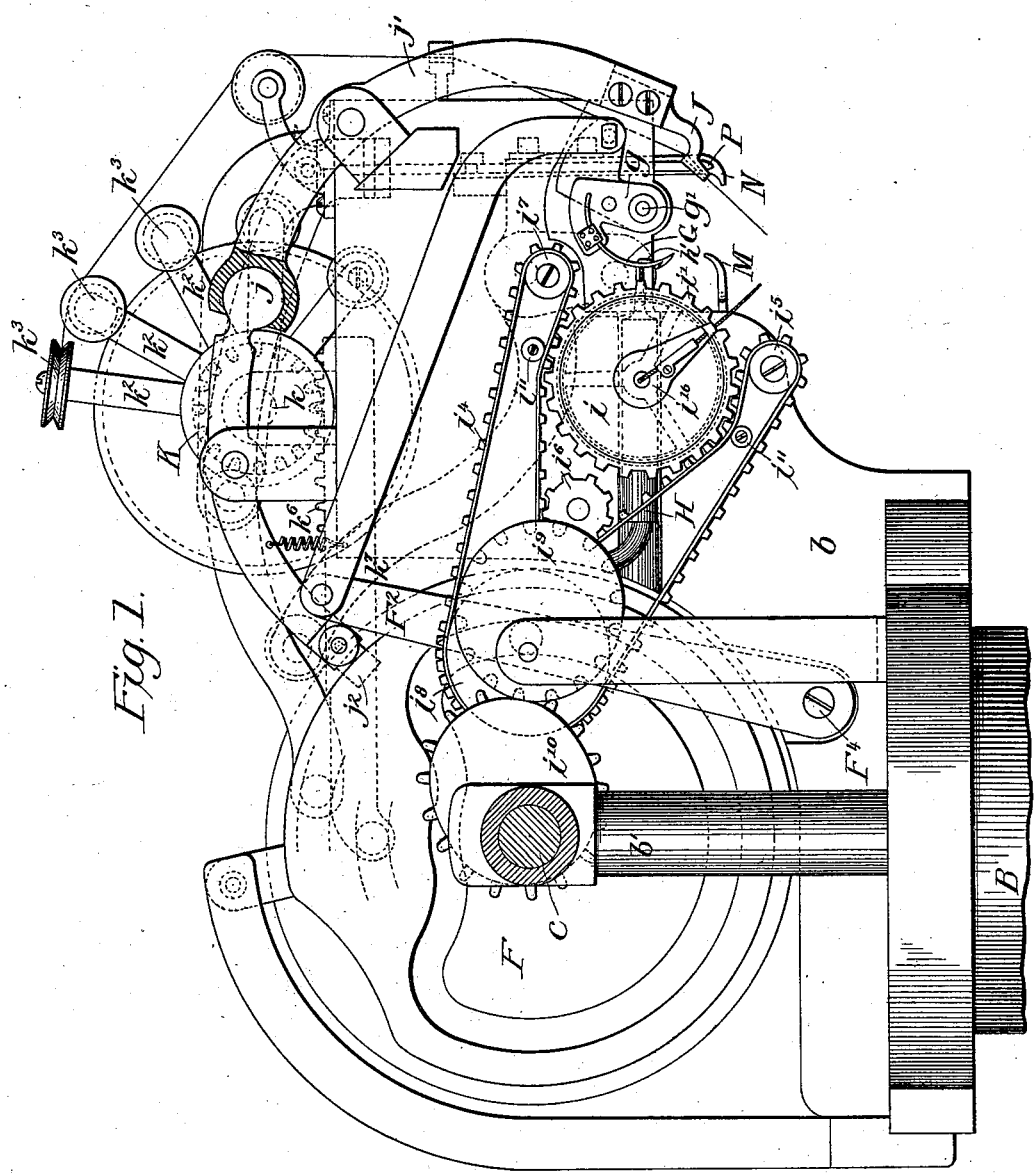

(No Model.) 8 Sheets—Sheet 1.
O. BELLEFEUILLE.
SEWING MACHINE.

No. 549,593. Patented Nov. 12, 1895.

Witnesses.
W. F. Hellen
[signature]

Inventor.
Olivier Bellefeuille.
by Herbert W. Jenner.
Attorney.

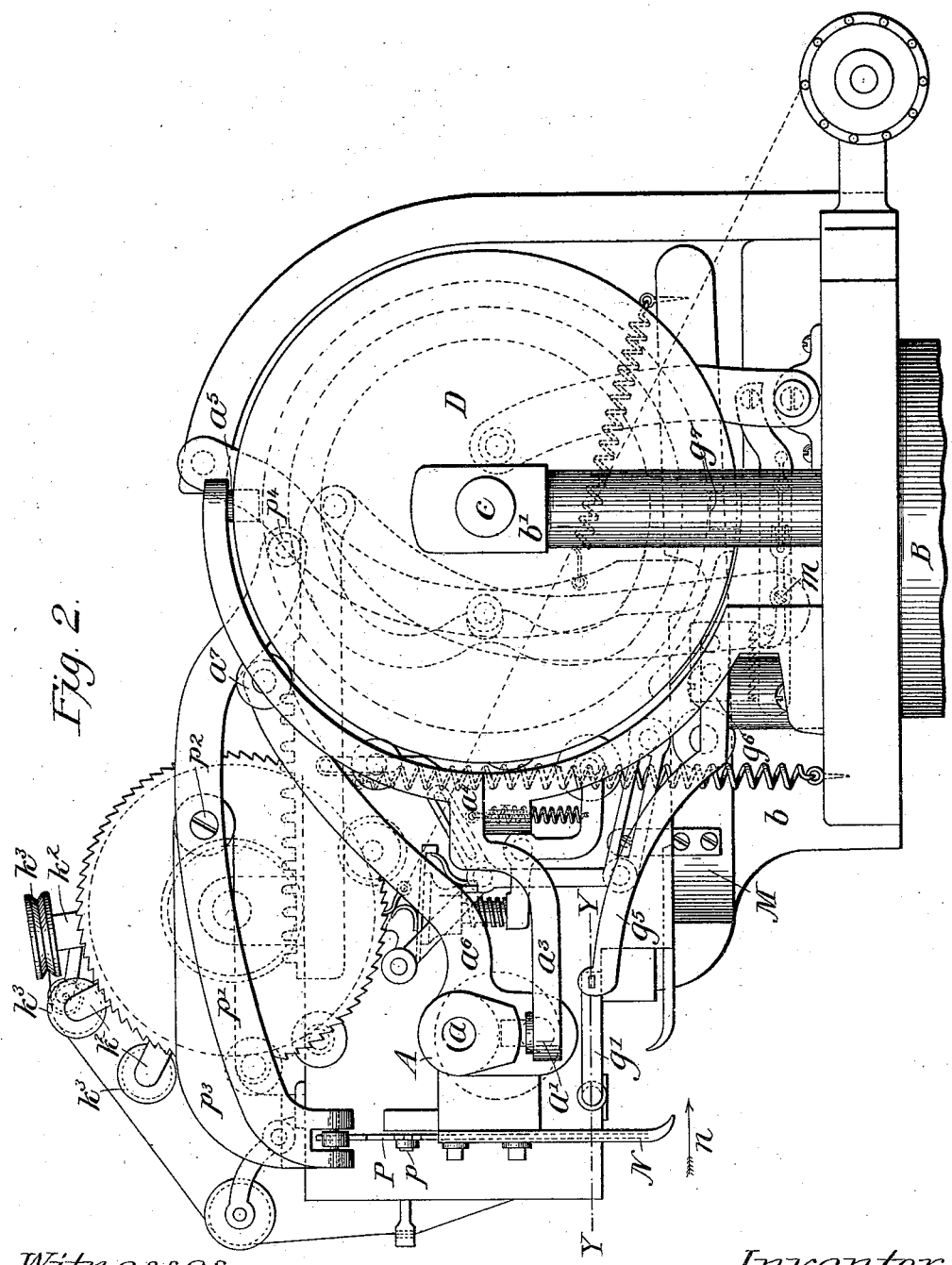

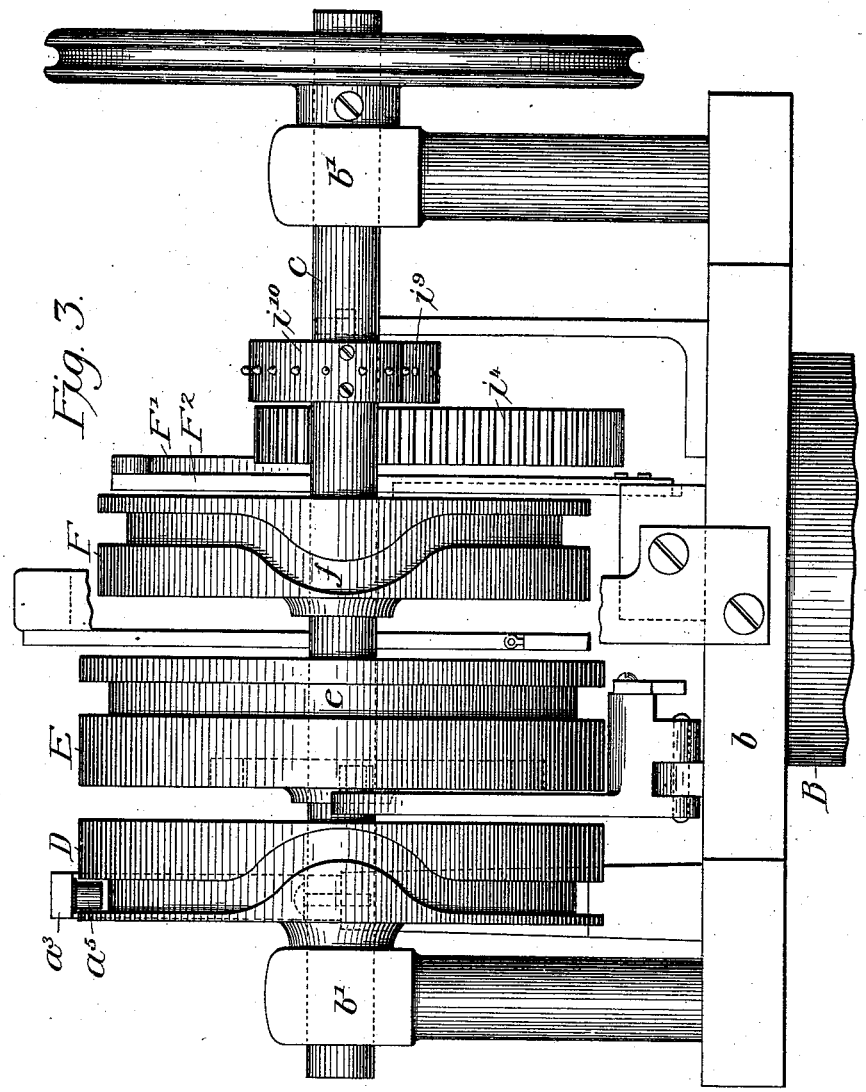

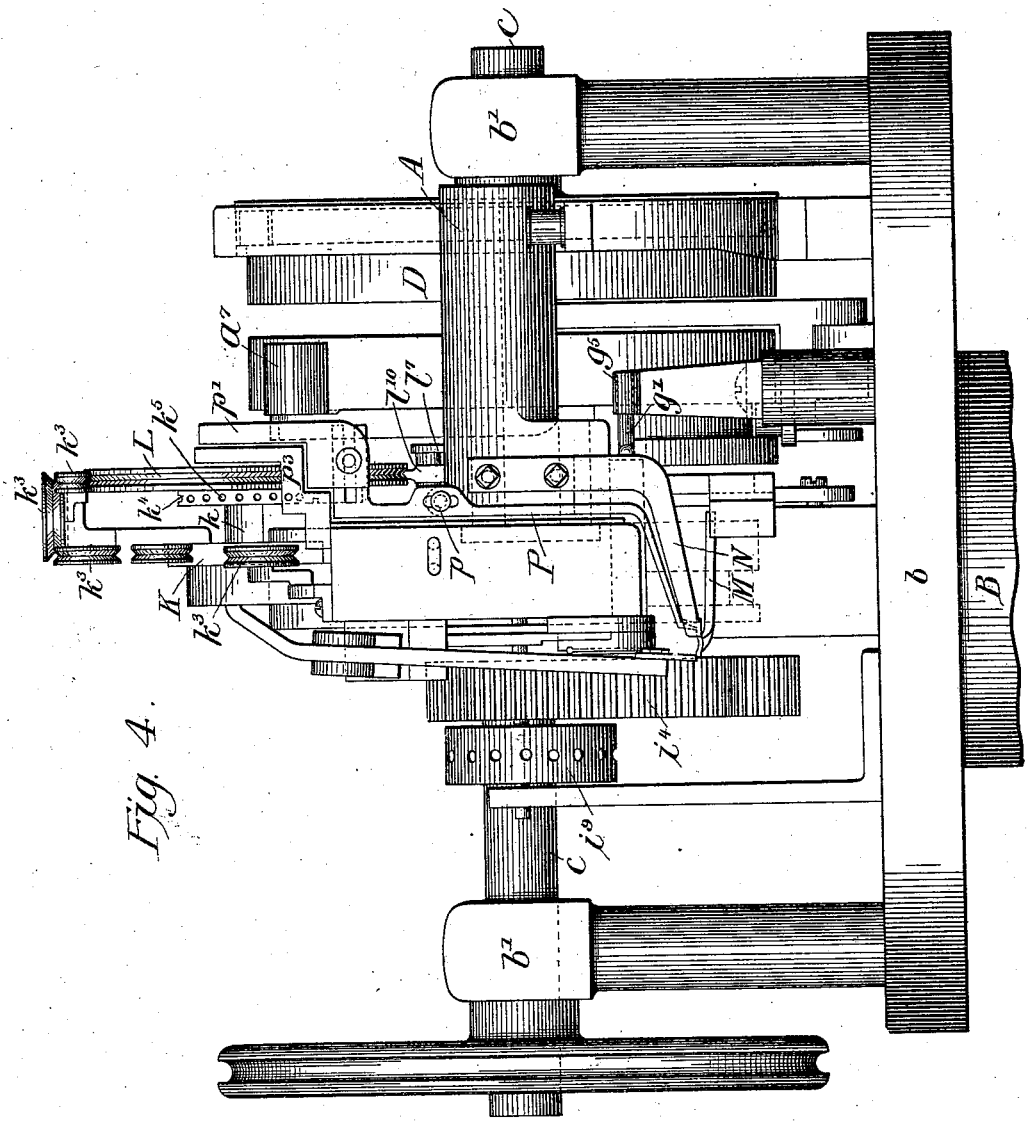

(No Model.) 8 Sheets—Sheet 5.
O. BELLEFEUILLE.
SEWING MACHINE.
No. 549,593. Patented Nov. 12, 1895.
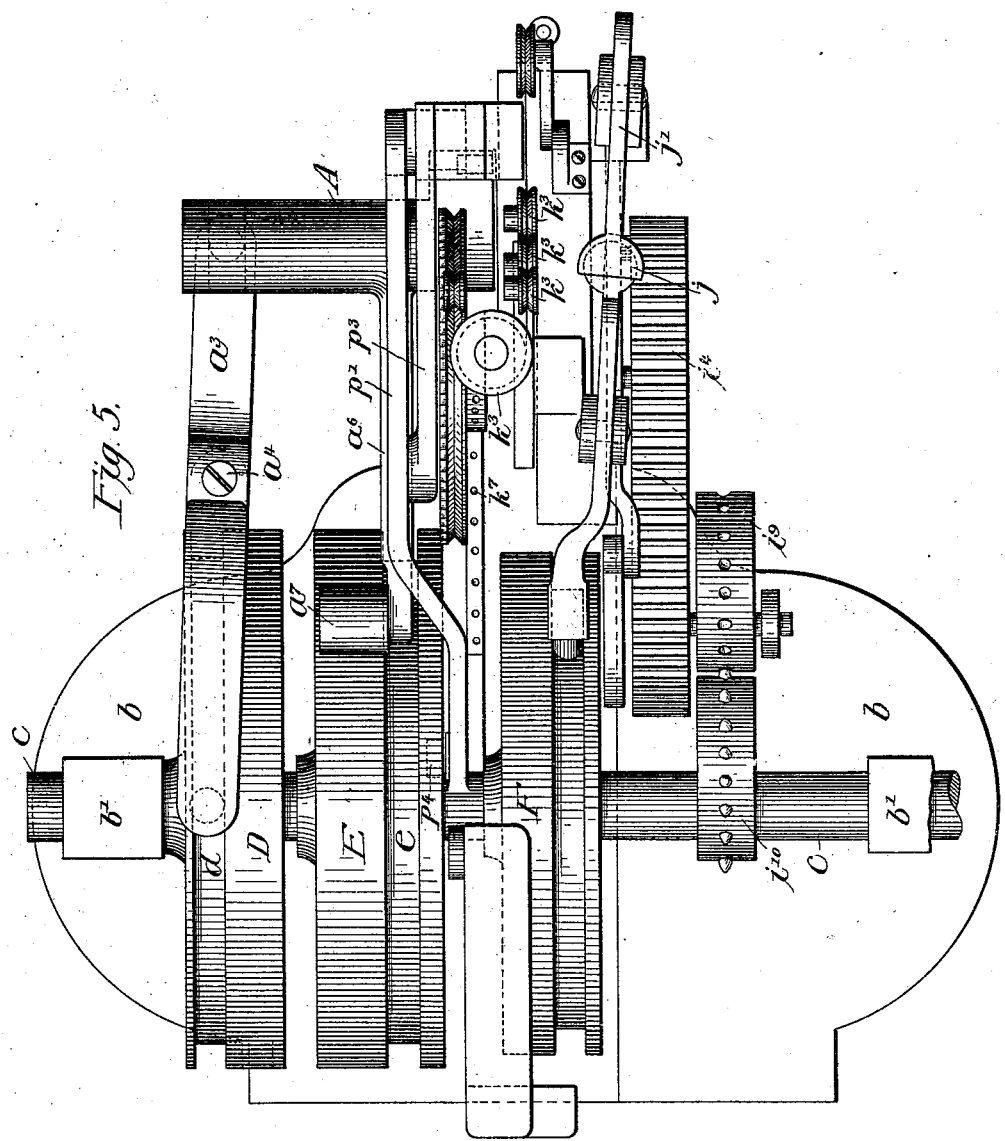

(No Model.) 8 Sheets—Sheet 6.
O. BELLEFEUILLE.
SEWING MACHINE.
No. 549,593. Patented Nov. 12, 1895.
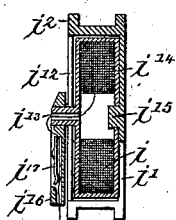
Witnesses.
W. Z. Hellen
Wm. M. Mister
Inventor.
Olivier Bellefeuille
by Herbert W. T. Jenner
Attorney (No Model.) 8 Sheets—Sheet 7.
O. BELLEFEUILLE.
SEWING MACHINE.
No. 549,593. Patented Nov. 12, 1895.
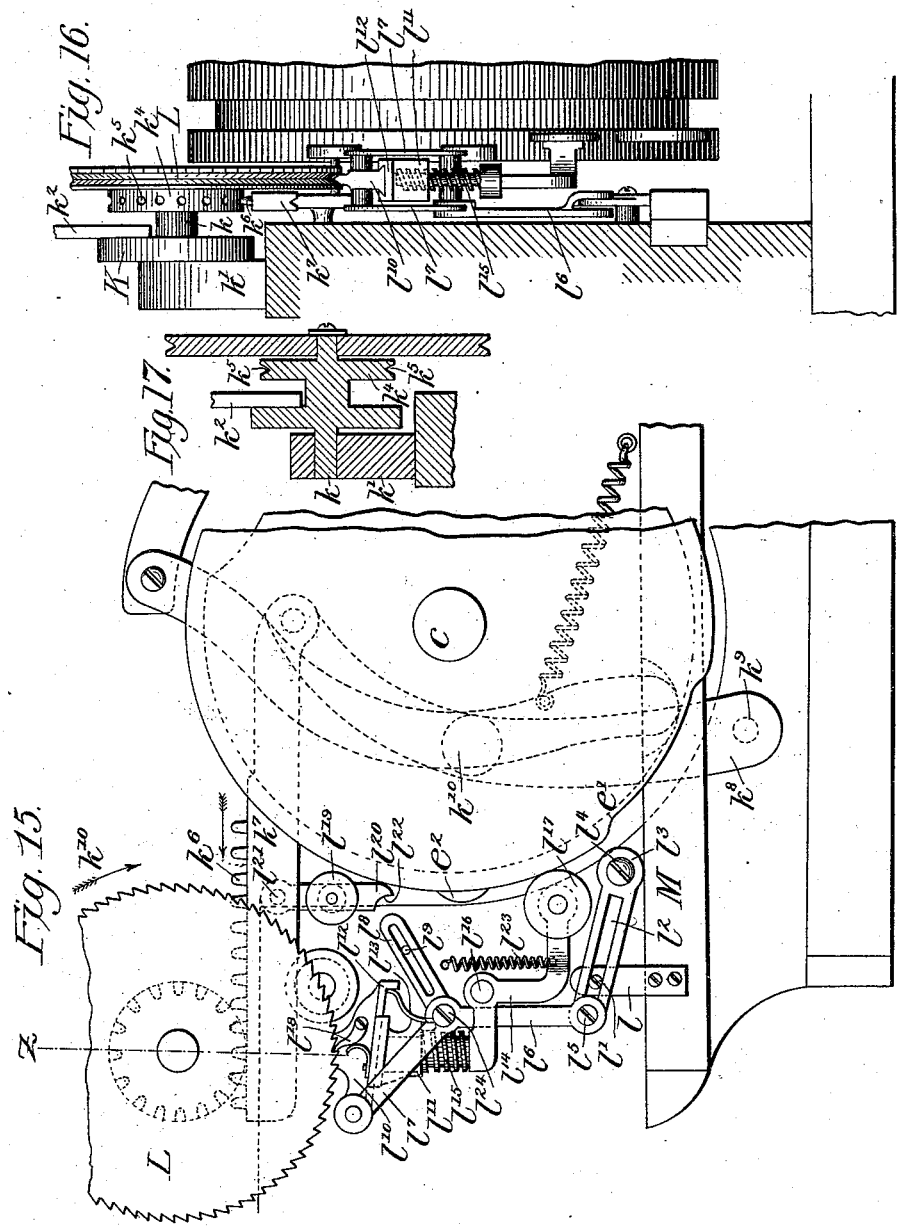

(No Model.) 8 Sheets—Sheet 8.

O. BELLEFEUILLE.
SEWING MACHINE.

No. 549,593. Patented Nov. 12, 1895.

Witnesses.
Inventor.
Olivier Bellefeuille.
by Herbert W. T. Jenner.
Attorney.

UNITED STATES PATENT OFFICE.

OLIVIER BELLEFEUILLE, OF MONTREAL, CANADA.

SEWING-MACHINE.

SPECIFICATION forming part of Letters Patent No. 549,593, dated November 12, 1895.

Application filed June 22, 1894. Serial No. 515,422. (No model.)

*To all whom it may concern:*

Be it known that I, OLIVIER BELLEFEUILLE, a citizen of the Dominion of Canada, residing at the city of Montreal, in the district of Montreal and Province of Quebec, Canada, have invented certain new and useful Improvements in Sewing-Machines; and I do hereby declare the following to be a full, clear, and exact description of the invention, such as will enable others skilled in the art to which it appertains to make and use the same.

My invention has reference to that class of sewing-machines employed by shoemakers, and has for its object to provide a lock-stitch wax-thread sewing-machine adapted to stitch uppers to soles of turned boots or shoes and to stitch welts to uppers and inner soles of welted boots or shoes, as explained hereinafter.

Referring to the drawings, similar letters refer to similar parts throughout the several views.

Figure 18:
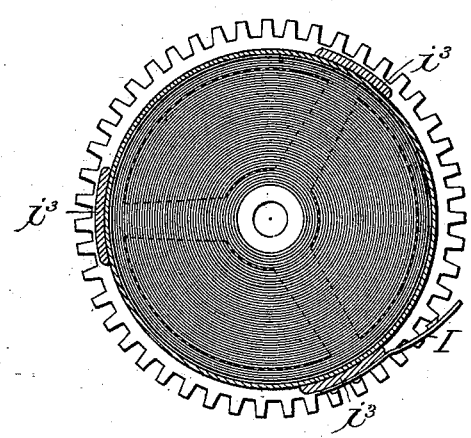
Figure 19:
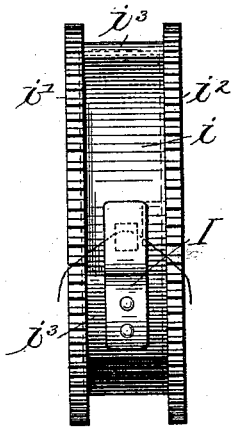
Figure 20:
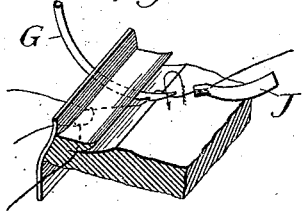
Figure 21:
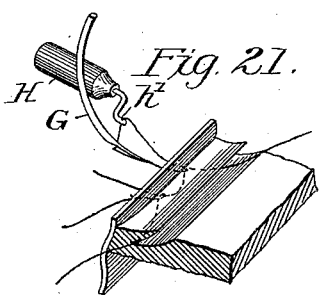
Figure 22:
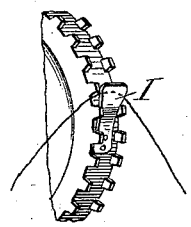

Figure 1 is a side view showing the shuttle. Fig. 2 is a view of the other side of my machine. Fig. 3 is a rear view. Fig. 4 is a front view. Fig. 5 is a plan view. Fig. 6 is a section of my shuttle. Fig. 7 represents a view of the needle and holding-hook and operating mechanism. Fig. 8 is an elevation of my holding-hook. Fig. 9 is a front view of same. Fig. 10 is a plan view of my holding-hook, Fig. 11 being a front view of same. Fig. 12 is a section on line X X of Fig. 10. Fig. 13 is a longitudinal section of piece A of Fig. 4. Fig. 14 is a horizontal view of my thread-giving-out device. Fig. 15 is a side view of the devices for holding and feeding the thread. Fig. 16 is a front view of same. Fig. 17 is a section on line Z Z of Fig. 15. Fig. 18 is a vertical section of my shuttle. Fig. 19 is an elevation of my shuttle; and Figs. 20, 21, and 22 are perspective views showing the different operations performed in making the stitch.

B is a suitable support, onto which is securely joined a suitable frame $b$, provided with any suitable number of brackets $b'$, which serve to support the main driving-shaft C, to which a rotary motion is imparted in any suitable way. Onto this shaft C are mounted the three cam-wheels D, E, and F, which are provided with cam-grooves to produce the several functions explained hereinafter.

The curved needle G is secured to the head $g$, which in turn is mounted on the shaft $g'$, which passes through the frame $b$, as shown in Fig. 14. The head $g$ is held in position on the crank $g^2$ by means of the projecting guide-bar $g^3$, which is firmly secured to the crank $g^2$, the head $g$ sliding freely along the guide-bar $g^3$ when made to do so by the shaft $g'$, which is joined at $g^4$ to the lever $g^5$, which is pivoted at $g^6$, Fig. 2, and provided with the trundle-roll $g^7$, (shown in pointed lines in Fig. 2,) which runs in the cam-groove $e$ of the cam-wheel E, this cam-groove $e$ imparting to the lever $g^5$, and thus to shaft $g'$, a vibratory motion, causing the needle G, with its head $g$, to move out in the direction indicated by the arrow in Fig. 14, and thence back into the position shown in the same view, thus making the needle G act as a loop-spreader, the vibratory motion being so timed as to produce this.

The mechanism giving motion to the needle consists of the levers F' and F$^2$, the latter being provided with the trundle-roll F$^3$ and pivoted at F$^4$ to the frame $b$ of the machine, the trundle-roll F$^3$ running into the cam-groove F$^5$ of the cam-wheel F. However, there is nothing new in this; but to the lever F$^2$, I attach the arm $h$ of the sleeve H, (shown on Figs. 7, 8, 9, 10, and 11,) to the end of which is secured my holding-hook $h'$ in any suitable manner, this sleeve H being made to turn one-quarter turn when the arm $h$ pushes in the direction $h^2$, Fig. 7, for as soon as the sleeve H butts against the stop $h^3$ the projection $h^4$, which is firmly joined to the arm $h$ and which butts against the spring $h^5$, forces the sleeve H to make one-quarter of a turn by sliding along the slot $h^6$, this making the hook $h'$ take the position shown in Fig. 9, while when the arm $h$ is pulled back or in a reverse direction to that shown at $h^2$ the hook $h'$ is made to turn up by the spring $h^5$, as shown in Fig. 11, and the sleeve, with the hook $h'$, is pulled somewhat back, so that it is out of the way of the needle. The object of this holding-hook $h'$ is to catch one side of the loop as pulled through by the needle G and hold it there while the needle carries the other side out far enough to allow the spring-hook I on the shuttle $l'$ to catch it, the whole as shown in Figs. 21 and 22. The advancing of the holding-hook $h'$ and its quarter downward motion are of course timed to correspond with the end of the backward movement of the needle and when the latter is ready to start on its loop-spreading motion, the sleeve H sliding along the groove $b^2$, made into the frame $b$ of the machine for it.

My shuttle $i$ is practically made of two sprocket-wheels $i'$ and $i^2$, secured to one another at a suitable distance apart by pieces $i^3$, which can be cast with them or not, the whole being made as shown on the drawings, and is held in position by means of a suitable sprocket-chain $i^4$, which laps sufficiently around it to secure it as shown in Fig. 1, this chain $i^4$ passing over the double sprocket-wheels $i^5$, $i^6$, $i^7$, and $i^8$, the latter being secured to the wheel $i^9$, which is given a rotary motion by means of the spur-wheel $i^{10}$, which is provided with teeth on its periphery, which enter corresponding recesses on the periphery of the wheel $i^9$. The two latter wheels, however, are oval in shape, so as to time the movement of the shuttle in such a way as to allow of the free action of the take-up by delivering the loop at the right time. The spur-wheel $i^{10}$ is mounted and firmly secured to the main driving-shaft C.

To hold the chain $i^4$ always firmly pressed against the shuttle, any suitable number of loose rollers $i''$ are inserted.

My shuttle $i$, Fig. 6, is provided with a cover $i^{12}$, which has a central opening through which the hollow projection $i^{13}$ of the top of the spool $i^{14}$, which contains the waxed thread, passes, this cover $i^{12}$ rotating with the shuttle; but the spool $i^{14}$, which is provided with an opening in its bottom, so that the projection $i^{15}$ of the shuttle $i$ can pass through it, and thus keep it into position, is stationary and does not turn with the shuttle. The shuttle is provided with the piece $i^{16}$, which has a suitable spring $i^{17}$ to give the necessary tension to the thread. J is my looper, differing from these now in use only by having a ball-joint at $j$, and thus having the lever $j'$ in two instead of one piece, it being operated, however, in the ordinary way by means of the trundle-roll $j^2$, running in the cam-groove $f$ of the cam-wheel F, and made to cause the looper J to make a circular vibration from left to right, as shown by the arrow in Fig. 20, so as to lap the upper thread over the needle, which is provided with a slanting side groove for this purpose, and thus holds the thread more firmly than those now in use.

My take-up consists of the wheel K, mounted on the shaft $k$, which is journaled in a bracket $k'$, Figs. 16 and 17, and which is provided with several arms $K^2$, provided with guide-pulleys $k^3$ for the upper thread. This wheel K, and consequently arms $k$, is made to partly rotate by means of the wheel $k^4$, which is secured to the same shaft $k$ as the wheel K and accessories, and which is provided with recesses $k^5$ on its periphery, into which project teeth $k^6$, which are secured to the piece $k^7$, sliding over the roller $k^{11}$, this piece $k^7$ being joined to the end of the lever $k^8$, Fig. 15, which is pivoted at $k^9$, and provided with a trundle-roll $k^{10}$, which runs in a suitable cam-groove on the cam-wheel F and is so arranged as to push the piece $k^7$ out in the direction shown by the arrow in Fig. 15 just in time to pull up the upper thread, this motion of course rotating the wheel K and accessories in the direction $k^{10}$, they immediately being rotated in the opposite direction of course by the same piece $k^7$. However, to be able to use this take-up the upper thread must be secured before its passage over the guide-pulleys $k^3$, as otherwise this rotating back and pulling on the thread would only result in pulling more of it out of the receptacle containing it, so that to secure the same I make use of a device composed of the grooved wheel L, over which the upper thread passes, as shown on the drawings, and one flange of the wheel L is provided with teeth, so as to form a ratchet-wheel, as shown in Figs. 15 and 16, this wheel L being loose on the end of the shaft $k$, as shown in Fig. 17. Now to the ordinary back gage M, provided with the ordinary locking device $m$, I secure an upright piece $l$, provided with a small projection $l'$ at its upper extremity, the latter sliding into a long slot $l^2$, placed in the lever $l^3$, which is pivoted at $l^4$ to the frame of the machine and at $l^5$ to the upright piece $l^6$, which has its other extremity joined to the double lever $l^7$ and to the slotted piece $l^8$, which slides on a projection $l^9$, secured to the frame of the machine, the upper end of the double lever $l^7$ being pivoted to the piece $l^{10}$, which is connected to the piece $l^{11}$ by suitable guides, so that it can slide backward or frontward on the piece $l^{11}$, its lower extremity being provided with a shoulder $l^{12}$, which bears against a spring $l^{13}$, which is secured to the piece $l^{11}$, the latter being placed on top of the lever $l^{14}$, as shown on Figs. 15 and 16, the spring $l^{15}$ serving as a cushion for the piece $l^{11}$. The lever $l^{14}$ is pivoted at $l^{16}$ to the frame of the machine and has its other extremity provided with the trundle-roll $l^{17}$, which runs on the periphery of the cam-wheel E, which is provided with the depression $e'$, into which the trundle-roll $l^{17}$ is pulled by the spring $l^{23}$, this having for effect to let the pieces $l^{11}$ and $l^{10}$ drop somewhat, the trundle-roll $l^{17}$ rising out of the depression $e'$ immediately and raising the said pieces into the position shown. Now to secure the thread for the take-up, and also to furnish the exact amount of thread required for each stitch and for each thickness of "between substance," my device acts as follows: The lower thread passing over the wheel L, as shown, passes between the bottom of the groove in the latter and the top of the piece $l^{10}$, which is shaped as shown on Fig. 16—that is, V-like—so as to introduce itself into the groove, and it is evident that when this piece $l^{10}$ is pressed upward by the trundle-roll $l^{17}$ and lever $l^{14}$ it jams the thread against the bottom of the groove on the wheel L, and as the piece $l^{10}$ is provided with the pawl $l^{18}$ the wheel L cannot slip out of position by the take-up K pulling out the thread. However, when the piece $l^{10}$ drops it does not go down far enough to disengage the pawl $l^{18}$, so that when the trundle-roll $l^{19}$, secured to the lever $l^{20}$, which is pivoted at $l^{21}$ to the frame of the machine, passes over the projection $e^2$ on the cam-wheel E the end $l^{22}$ of the lever $l^{20}$ strikes against the slotted piece $l^8$, and thus forces the piece $l^7$, and consequently piece $l^{10}$, ahead, thus pushing the wheel L around a certain distance in the direction of the arrow $k^{10}$, the piece $l^{10}$ immediately retaking its position under the influence of the spring $l^{13}$, and the partial rotating of the wheel L giving out a certain amount of thread. Now it can easily be seen that this arrangement also regulates automatically the amount of thread required for each thickness of between substance, for as the piece $l$ is secured to the ordinary back gage M the thicker the between substance and upper or between substance upper and welt the closer toward the point $l^4$ will the projection $l'$ be, and consequently the higher the point $l^{24}$ and the closer the end of the slotted piece $l^8$ to the end of $l^{22}$ of the lever $l^{20}$, so that the latter shall push the piece $l^{10}$, and consequently wheel L, much farther, thus giving more thread, the reverse taking place with a thinner thickness to sew through.

My feeding arrangement consists in the feeding-dog P, made as shown in Fig. 4 and secured to the oscillating head A at $p$, where it is slotted out, so as to permit its upward and downward movement, which is communicated to it by means of the lever $p'$, pivoted at $p^2$ to the bracket $p^3$, and provided at its other extremity with a trundle-roll $p^4$, which passes over the cam-wheel E, the latter giving the feeding-dog its upward and downward movement, while its side movement is imparted to it by means of the head A, which can slide over the piece $a$ in the direction indicated by the arrows in Fig. 13, but can oscillate only around the shaft $a'$, which, with the piece $a$, is joined to the piece $a^2$, secured on the frame $b$ in any suitable way, the lever $a^3$ giving the piece $a$ this side motion, as can be readily seen on the drawings, by being pivoted at $a^4$, as shown in Fig. 5, and having a trundle-roll $a^5$ running in the cam-groove $d$ of the cam-wheel D. The lever $a^6$, joined to the head A, is provided with the trundle-roll $a^7$, which passes over the cam-wheel E and causes the head A and ordinary channel-guard N to incline inward in the direction indicated by the arrow $n$ on Fig. 2; but this channel-guard N does not feed the work, it only serving to firmly hold the boot between the back gage and itself while the needle is penetrating through the between substance, its point of course keeping the channel well open.

My reason for adopting a separate dog P to feed the work is simply this: that when the work is fed by the channel-guard N the between substance is sometimes injured, while with my device the dog P sticks its point into the sole itself and there is no fear of injuring the sole in any way, it helping the channel-guard to hold the work. Of course all these levers and cams must be so timed as to advance the boot when the needle has retracted and firmly secure it when it is going through.

Having described my invention, what I claim, and desire to secure by Letters Patent, is—

1. In a sewing machine the combination of a shuttle $i$, composed of two sprocket wheels $i'$ and $i^2$ separated by pieces $i^3$, top $i^{12}$, piece $i^{16}$, spring $i^{17}$ and spring hook I, set in motion by the sprocket chain $i^4$ kept in position by means of a suitable number of rollers $i^{11}$, and passing over the double sprocket wheels $i^5$, $i^6$, $i^7$, and $i^8$, propelled by wheel $i^9$ and spur wheel $i^{10}$, with a curved needle G acting as a loop spreader, the holding hook $h'$ and looper J having the ball joint $j$, substantially as described and for the purposes set forth.

2. In a sewing machine the combination of an ordinary curved needle G, secured to a head $g$ oscillating around the shaft $g'$ through the crank $g^2$, which is provided with the projecting guide bar $g^3$, and set in motion by means of the ordinary mechanism, through lever F', and acting as a spreader by being pushed out by means of lever $g^5$, trundle roll $g^7$, and cam groove $e$, with the holding hook $h'$ worked by the sleeve H, having the slot $h^6$ and spring $h^5$ through the projection $h^4$, lever F$^2$, cam groove F$^3$, and stopper $h^3$, all substantially as described and for the purposes set forth.

3. In a sewing machine the combination of a take up composed of the wheel K, having the arms $k^2$ provided with the guide wheels $k^3$, all mounted on a shaft $k$, with the wheel $k^4$ having the recesses $k^5$ on its periphery into which work the projections $k^6$ of the piece $k^7$, set in motion by means of the lever $k^8$ and trundle-roll $k^{10}$, with a thread giving device worked by the back gage and composed of the grooved wheel L, having one flange of the groove provided with teeth so as to form a pawl wheel, sliding piece $l^{10}$ provided with the ratchet $l^{18}$ piece $l^{11}$, springs $l^{13}$ and $l^{15}$ lever $l^{14}$ having spring $l^{23}$ and trundle-roll $l^{17}$ depression $e'$, double lever $l^7$, lever $l^6$, slotted lever $l^3$, piece $l$, which is provided with the projection $l'$, and joined to the back gage M, slotted piece $l^8$, sliding on the projection $l^9$, piece $l^{20}$ provided with trundle-roll $l^{19}$, projection $e^2$ and the back gage M, all substantially as described and for the purposes set forth.

4. In a sewing machine, the combination, with the oscillatory crank $g^2$ provided with a laterally-projecting guide-bar; of the head, for carrying the needle, slidable on the said guide-bar; the curved needle and means for oscillating the same; the shaft supporting the said head concentric with the said crank; and driving mechanism operating to slide the said shaft and head back and forth laterally, substantially as set forth.

5. In a sewing machine, the combination, with the oscillatory crank $g^2$, and the oscillatory and laterally-movable head, for carrying the needle, operatively connected with the said crank; of the levers $F'$ and $F^2$, the roll $F^3$, and the cam $F$, operating to oscillate the said crank and head; the slidable and revoluble sleeve $H$, and the holding hook $h$; and driving devices, for operating the said sleeve and hook, connected to the said lever $F^2$, substantially as set forth.

6. In a sewing machine, the combination, with a shuttle having sprocket wheels on its periphery; of a sprocket chain engaging with the said sprocket wheels above and below the shuttle, the sprocket wheels $i^3$, $i^5$, $i^6$, and $i^7$, operating to support and drive the said chain; and a pair of oval toothed-wheels operatively connecting the said sprocket wheels and chain with the driving shaft, substantially as set forth.

7. In a sewing machine, the combination, with a take-up wheel $K$ mounted on a shaft and provided with a plurality of projecting arms each carrying a guide pulley for the upper thread; of a wheel secured to the wheel $K$ and provided with recesses in its periphery, a slidable bar provided with teeth engaging the said recesses, a pivoted lever for operating the said bar, a roll projecting from the said pivoted lever, and a cam provided with a groove engaging with the said roll, substantially as set forth.

8. In a sewing machine, the combination, with the grooved wheel $L$ provided with ratchet teeth on its periphery; of a vertically and longitudinally slidable piece operating to clamp the upper thread in the groove of the said wheel; a spring-actuated pawl pivoted to the said piece and engaging with the said ratchet teeth; and two separate actuating mechanisms, one operating to raise the said piece, and the other to slide it longitudinally thereby partially revolving the said wheel, substantially as set forth.

9. In a sewing machine, the combination, with the grooved wheel $L$ provided with ratchet teeth; of the pivoted lever $l^{14}$ provided with an operating spring and a roll; a cam provided with a recess for the said roll to drop into; a spring-supported guide piece carried by the said lever; the thread clamping piece $l^{10}$ slidable longitudinally in the said guide piece and provided with a spring-actuated pawl engaging with the said ratchet teeth; and tappet mechanism operating to slide the said piece $l^{10}$ longitudinally, thereby partially revolving the said wheel, substantially as set forth.

10. In a sewing machine, the combination, with the grooved wheel $L$ provided with ratchet teeth; and the vertically-movable piece $l^{10}$, for clamping the thread, provided with a spring-actuated pawl engaging with the said ratchet teeth; of the arms $l^7$ and $l^8$ pivotally connected to the piece $l^{10}$; a spring for moving the said piece longitudinally in one direction; and a pivoted tappet lever for moving the said piece in the opposite direction, substantially as set forth.

11. In a sewing machine, the combination, with the back gage $M$, and the piece $l$ secured thereto and provided with a lateral projection; of a pivoted lever provided with a slot engaging the said projection; the upright piece, and the arms $l^7$ and $l^8$ pivoted to the said lever; the slidable piece $l^{10}$ pivoted to the arm $l^7$ and provided with a spring-actuated pawl; the grooved wheel $L$ provided with ratchet teeth and engaging with the last said piece and its pawl; and the pivoted tappet lever $l^{20}$, the distance between the lever $l^{20}$ and the arm $l^8$, and consequently the amount of revolution of the wheel $L$ and the feed of the thread, being regulated by the position of the said back gage, substantially as set forth.

12. In a sewing machine, the combination, with the oscillatory head $A$, and the parts $a$, $a'$, $a^2$, supporting the said head, said head being slidable on the part $a$ and pivoted on the part $a'$; of the channel guard $N$ carried by the said head; the feed dog $P$ provided with an elongated pivot hole and pivoted to the said head and oscillated thereby; and driving devices for reciprocating the said feed dog in a vertical direction, substantially as set forth.

In testimony whereof I have affixed my signature in presence of two witnesses.

OLIVIER BELLEFEUILLE.

Witnesses:
JAMES LAURIN,
F. X. MALOY.